June 17, 1969        I. E. WILKIN        3,450,159

CONTROL BOX FOR WATER FAUCETS

Filed April 5, 1966

INVENTOR.
Ira Elmore Wilkin 3,450,159
CONTROL BOX FOR WATER FAUCETS
Ira Elmore Wilkin, Sycamore St.,
Lynchburg, Ohio 45142
Filed Apr. 5, 1966, Ser. No. 540,271
Int. Cl. F16k 19/00, 31/06
U.S. Cl. 137—606       1 Claim

ABSTRACT OF THE DISCLOSURE

A regulating device for water faucets delivering hot and cold water having a unitary mounting structure, the regulating device providing selectively controlled mixed water temperatures, the device including a control box electrically connected in series circuit with a solenoid valve on the hot water line and a solenoid valve on the cold water line, each solenoid valve being located in series with a regulating valve.

---

This invention relates to regulating and controlling devices, and more particularly a control box for water faucets.

It is therefore the main purpose of this invention to provide a control box for water faucets to provide easy and instantaneous regulation of hot and cold water supply.

Another object of this invention is to provide a control box for water faucets wherein it is possible to establish the desired flow of water and to adjust the line pressure thereof.

Another object of this invention is to provide a control box for water faucets wherein hot and cold water may be mixed at a predetermined temperature.

Still another object of this invention is to provide a control box for water faucets which is of rugged construction, inexpensive to manufacture, and provides maximum utility to its user.

Other objects and advantages of this invention will become apparent from a consideration of the following detailed description taken in connection with the accompanying drawing, wherein a satisfactory embodiment of the invention is shown. However, it is to be understood that the invention is not limited to the details disclosed but includes all such variations and modifications as fall within the spirit of the invention and the scope of the appended claims.

Figure 2:
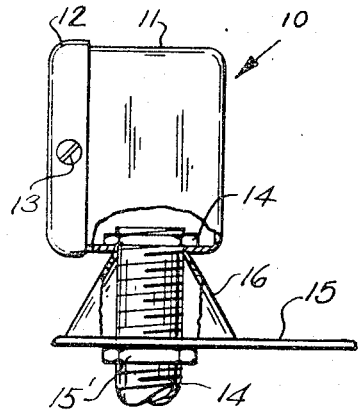
FIGURE 2 is a side view of the control box seen in FIGURE 1.
Figure 1:
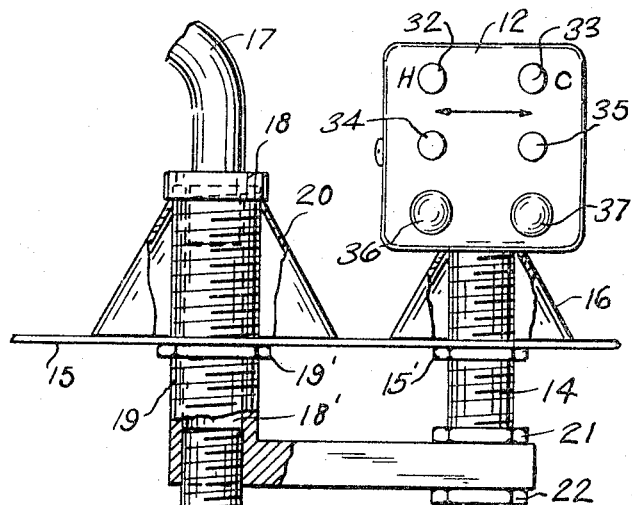
FIGURE 1 is a face view of this invention.
Figure 1:
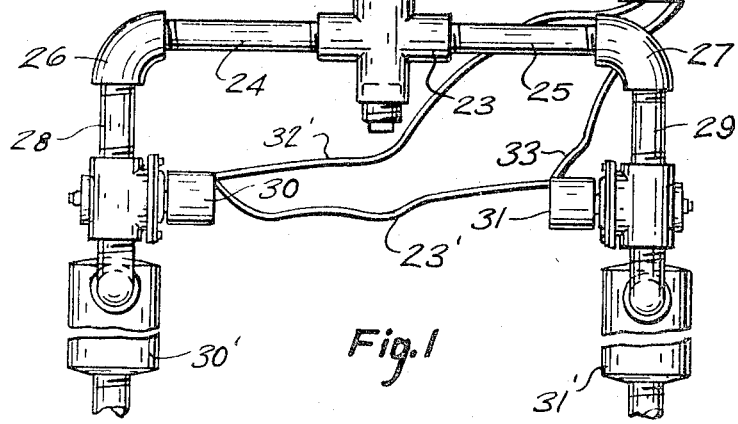
Figure 3:
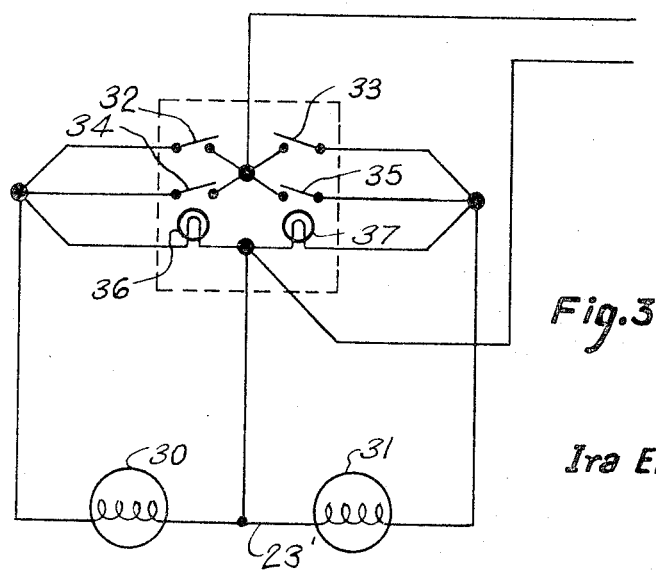
FIGURE 3 is a wiring diagram of the electrical connections in accordance with this invention.

According to this invention, a control box for water faucets is designated as 10 and is provided with a substantially rectangular shell or housing 11. A front cover 12 is suitably secured to said housing by means of a plurality of screws 13. Housing 11 is supported on a rim or flange 15 of a sink (not shown) by means of a threaded pipe 14. If desired to remove housing 11 from sink 15 lock nuts 14' are to be loosened and/or removed. A guard 16, of generally conical configuration is super-imposed on the pipe 14 for protecting said pipe from dust, dirt and other foreign objects. The bottom portion of pipe 14 is secured to the solid section of L-shaped member 19 by means of lock nuts 21 and 22. The hollow, threaded section of member 19 extends in a perpendicularly upward direction and is secured within the rim or flange 15 of a sink (not shown). A standard spout 17 extends from the upper extremity of the L-shaped member 19. A conically shaped guard 20 protects the upwardly disposed portion of member 19 from dust and other foreign objects. A lock-nut 18 secures the guard 20 to the upper portion of said member 19. The cylindrical hollow portion of member 19 is adapted to threadingly receive one section of cross pipe 23 which, in turn, is removably secured with the horizontally disposed pipe sections 24 and 25. Elbows 26 and 27 secure pipe sections 24 to 28 and sections 25 to 29. Pipe section 28 is operably secured to a hot water solenoid valve 30 which is suitably designated as a hot water switch. Similarly, the pipe section 29 is conveniently secured to the solenoid valve 31 which is considered a cold water switch. Valves 30 and 31 are connected in series to the regulating valves 30' and 31' which, in cooperation with said switches, control the flow of water into the sink.

Looking now at the drawing, one will see that the cover 12 is provided with an "on" hot water push button switch 32 and a similarly disposed cold water push button switch 33. These push button switches 32 and 33 closely cooperate with their respective solenoid valves 30 and 31 for delivering hot, cold or mixed water into the sink. In addition, push button switches 34 and 35 are adapted, in cooperation with the solenoid valves 30 and 31, to instantaneously provide limited drafts of water into the sink. Furthermore, a pair of indicating lights 36 and 37 are mounted on said cover 12 for the purpose of indicating the flow of water into the sink. Solenoid valves 30 and 31 are electrically connected with the components 32, 33, 34, 35, 36 and 37 by means of conductor wires 32' and 33'. As it can be seen from the schematic diagram, conductor wire 32' activates or deactivates the components related with the hot water supply and the wire 33' provides current to the components connected with the cold water supply. It should be noted, that due to the fact that the push button switches, such as, 34 and 35 may be depressed simultaneously, thus causing an output of mixed hot and cold water.

The push buttons 32 through 35 provide a means for manually activating the solenoid motors which in turn control the water flow. The push button 33 is pushed in for turning on the water and is then again pushed for turning off the water, the push button 33 controlling the cold water. Likewise the push button 32 operates in the same manner and serves to control the hot water. The indicating lights 36 and 37 show which valve is on, whether the same be a hot or cold. The push button 35 is just a push and hold switch means for a small amount of cold water. The push button 34 is the same except that it serves hot water.

It will also be noted that, in operation, the solenoid valves 30 and 31 in conjunction with the water regulating valves 30' and 31' supply the desired water flow in accordance with the switching operations of the push button switches located within housing 11. Furthermore, the regulating valves 30' and 31' may be periodically adjusted to establish the predetermined flow into the spout 17 at a predetermined pressure.

What I now claim is:

1. In a water flow control system, the combination of a control box housing, primary and auxiliary hot and cold water relay members within said housing, a removable front cover secured to said housing, push button members extending outward of said housing, said push button members being electrically connected with a respective one of said relay members for manually regulating the flow of water, an externally threaded pipe being secured at one end to said housing, said threaded pipe being adapted to extend through an opening in a flange of a sink, a conically configurated guard surrounding said pipe and adapted to bear at its opposite ends between said housing and said sink flange, a nut threadingly engaged upon said threaded pipe and adapted to be positioned against the under side of said sink flange, the opposite end of said threaded pipe being secured to the outer end of one leg of an integrally formed L-shaped member, the opposite leg of said L-shaped member having an elongated central opening extending lengthwise therethrough, said opposite leg of said L-shaped member extend through a second opening through said sink flange, one end of said opening communicating with a spout, the opposite end of said opening communicating with a T fitting having opposite, integrally threaded openings each of which is engaged to a pipe engaged at its opposite end to an elbow, each of said elbows engaging at their opposite ends a pipe which is connected to a solenoid valve, one of said valves comprising a hot water solenoid valve, the other of said valves comprising a cold water solenoid valve, said solenoid valves being electrically connected through said primary and auxiliary relay members within said housing to a power source, and one of said valves being connected to a hot water source while the other of said valves is connected to a cold water source.

References Cited

UNITED STATES PATENTS

| | | | |
|---|---|---|---|
| 2,908,017 | 10/1959 | Whaley | 137—606 X |
| 2,910,090 | 10/1959 | Weir | 137—625.41 |
| 2,955,295 | 10/1960 | Young | 4—192 |
| 2,991,481 | 7/1961 | Book | 4—194 X |

FOREIGN PATENTS 1,307,336  9/1962  France.

WILLIAM F. O'DEA, *Primary Examiner.*

D. H. LAMBERT, *Assistant Examiner.*

U.S. Cl. X.R.

4—192